G. M. KNEUPER.
FILTER.
APPLICATION FILED SEPT. 10, 1909.
973,868.
Patented Oct. 25, 1910.
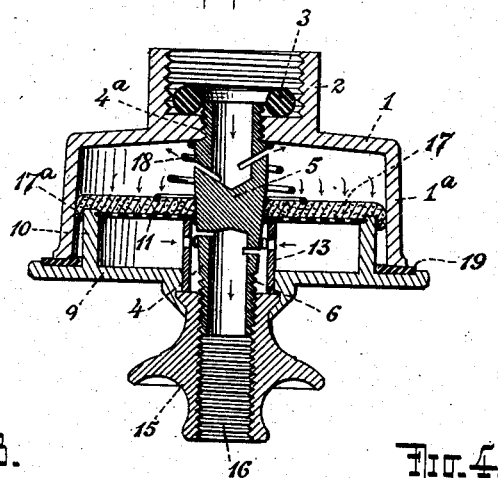
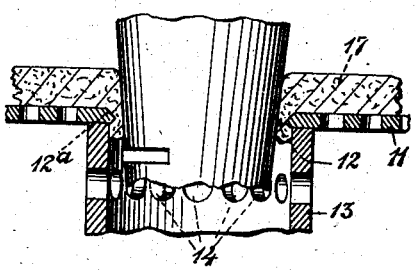
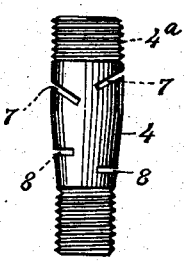
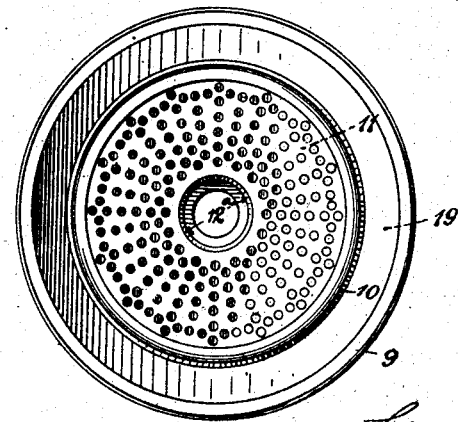
WITNESSES:
INVENTOR
George M. Kneuper
BY
ATTORNEYS

UNITED STATES PATENT OFFICE.

GEORGE M. KNEUPER, OF BROOKLYN, NEW YORK.

FILTER.

973,868.      Specification of Letters Patent.      Patented Oct. 25, 1910.

Application filed September 10, 1909. Serial No. 517,036.

*To all whom it may concern:*

Be it known that I, GEORGE M. KNEUPER, a resident of the borough of Brooklyn, county of Kings, city and State of New York, have invented certain new and useful Improvements in Filters, of which the following is a specification.

My invention relates to filters and has for its object to provide a filter of great practical value which may be easily and readily put together and taken apart and in which the maximum amount of effective filtering surface is readily available and not likely to become clogged and rendered ineffective by gathering impurities. In filters generally, as the filtering material gradually becomes coated with such impurities, the tendency of the entering liquid is to find an outlet of least resistance, usually the point of engagement between the said filtering material and the filter shell. This results in a by-passing of unfiltered liquid at these points; and it is a further object of my invention to overcome this disadvantage and to provide a structure which will do away with the possibility of this by-passing of unfiltered liquid.

My improved filter is further constructed to prevent the inflowing liquid from impinging directly on the filtering material, thus increasing the life of the filtering material and securing longer and better results than if the liquid impinged against the filtering material throughout a reduced area thereof.

My improved filter further comprises a two-part construction, which may be readily assembled and locked together without tearing or otherwise damaging the filtering material itself.

Other objects of my invention will appear from the description hereinafter and the features of novelty will be pointed out in the appended claims.

Reference is to be had to the accompanying drawings in which—

Figure 1 is a central vertical section of my improved filter; Fig. 2 is a plan view of the lower portion thereof; Fig. 3 is an enlarged detail cross section of my improved structure; and Fig. 4 is a detail elevation of the inlet and outlet pipe.

The filter comprises a shell 1 having an internally screw threaded projection 2 adapted for connection with a faucet or other source of liquid to be filtered, a ring washer or gasket 3 being located in said projection 2 in order to secure a tight joint between the faucet and the filter at this point. The downwardly projecting flange 1ª of the shell 1 converges slightly toward the projection 2.

4 is a tube, the screw threaded upper end 4ª of which is adapted to be screwed into an opening in the upper wall of the shell 1 so that when said tube is in operative position it will be in axial alinement with the mouth of the faucet or other source from which the liquid to be filtered is secured. The said tube 4 is divided into two compartments by means of a central partition 5 and is tapered in a direction away from the projection 2, the lower end thereof being screw threaded as indicated at 6 for the purpose to be more fully described hereinafter. At convenient points above the partition 5 the said tube is provided with upwardly inclined slots or openings 7, while below the partition 5 the said tube is formed with slots 8, which preferably project at substantially right angles to the axis of said tube.

The lower part of the filter comprises a casing 9 having an upwardly extending annular flange 10 to which is secured the perforated plate 11, provided with a central opening 12 through which the tube 4 is adapted to extend. The opening 12 is of a slightly greater diameter than the diameter of the tube 4 and is provided with inclined walls 12ª. A collar 13 is secured to the casing 9 and projects upwardly into engagement with the lower face of the perforated plate 11, and is formed with a row of apertures 14 for the escape of the filtered water.

15 is a swivel nut rotatably secured on the casing 9 and is provided with a screw-threaded axial opening 16 adapted for engagement with the screw threaded end 6 of the tube 4. It is to be understood that this nut 15 is so secured in position in the casing 9 as to be freely rotatable relatively thereto without, however, being capable of any other motion relative to said casing.

17 is a sheet of filtering material carried by the casing 9 and preferably conforming in shape to the interior of the shell 1 and further having a central opening through which the tube 4 in the operative position of the parts is adapted to extend. 18 is a coil spring surrounding said tube 4 and having its one end in engagement with the filtering material 17 and its other end abutting against the upper inner face of the shell 1. The filtering material 17 projects beyond the flange 10, the reason for which will be more clearly brought out hereinafter.

In assembling the parts the filtering material is placed over the perforated plate 11 with its central opening in axial alinement with the collar 13 and with its edges extending beyond the flange 10 which in the assembled condition of the parts is spaced from the interior surface of the flange 1ª. After this has been done the casing 9 is placed within the shell 1 and the nut 15 by rotation relatively to the filter casing is engaged with the screw threaded end of the tube 4, so that finally the parts will be firmly clamped together. As the nut 15 is thus rotated, the casing 9 will be forced up into the shell without, however, being rotated relatively thereto, and owing to the inclined or converging sides of the shell 1 the overlapping edges 17ª of said filtering material will be turned down and firmly clamped in the annular space between the flange 1ª of the shell 1 and the flange 10. At the same time owing to the inclined portions 12ª of the central opening 12, as the parts are screwed together a boss will be formed upon the said filtering material adjacent to said central opening 12 as clearly shown in Fig. 3, so that the filtering material will be firmly clamped between said inclined portions 12ª and the inclined walls of the tube 4. In the meantime the coil spring 18 has been compressed. It will thus be seen that the filtering material is firmly clamped at its outer edges and is also firmly clamped adjacent to its central opening, so that it is impossible for any liquid to pass between the filtering material and the shell 1, or between the filtering material and the tube 4. One of the most objectionable features of existing filtering constructions, that is, by-passing of unfiltered liquid at these points is thus absolutely avoided. To secure a tight joint at the point of engagement between the shell 1 and the casing 9, I introduce a gasket or washer 19 between said parts.

In operation liquid to be filtered enters the upper end of the tube 4 by way of the projection 2 and passes to the interior of the filter through the upwardly inclined slots 7. Owing to the upward inclination of these slots, the inrushing liquid is directed against the upper wall of the shell and from there gradually reaches the filtering material. By this construction the liquid to be filtered is diffused and does not impinge directly against the filtering material continually at the same point, so that excessive wear of the filtering material at any single point of its area is obviated. The life of said material is thus materially prolonged and in addition the liquid is brought into contact with the filtering material throughout, so that the entire area thereof is made use of for filtering purposes resulting in a more efficient filtering than if a limited area of said material only were used. The liquid passes through said filtering material and through the perforated plate 11 into the chamber formed by the annular flange 10 and finally flows through the apertures 14 and through the openings 8 to the interior of the tube 4 and from there through the central opening 16 of the nut 15.

My improved filter therefore consists essentially of two separable parts, which are readily disconnected and just as readily put together again without tearing or otherwise injuring the filtering material 17. It will readily be seen that as the parts are connected or disconnected, the only relative movement between said parts is an axial one, the only portion thereof which rotates being the nut 15. The filtering material itself is not rotated during this connecting and disconnecting operation, so that, as before stated, it is not likely to be torn or injured as the parts are assembled or separated.

When it is required to insert a new disk of filtering material, it is only necessary to reverse the rotation of the nut 15 to separate the casing from the shell, the spiral spring 18 during this operation causing the filtering material 17 to follow the outward movement of the casing 4 relatively to the shell 1, until finally the parts are disengaged. Owing to the pressure exerted by the spring 18, the filtering material cannot stick in the shell 1, but remains evenly placed on the perforated plate 11 and flange 10, from which it may easily be removed after the parts have been disengaged without the necessity for handling it. The spring 18 further tends to press the shell 1 and the casing 4 apart thus aiding in the separation of these parts and overcoming any tendency to bind which the shell and casing may have. By providing the upwardly inclined cuts or slots 7 in the upper portion of the tube 4, the inrushing liquid is directed against the roof of the shell and from there to the sides thereof, and finally reaches that part of the filtering material first where said material is tightly packed between the shell and the casing and consequently of a greater density and strength and not likely to be easily worn out. From this point the liquid gradually spreads over the entire surface of the filtering material and through the same to the outlet as hereinabove described. The said filtering material thus suffers no damage by reason of the impact of the water however great the inrushing force thereof may be.

Various modifications may be made without departing from the spirit of my invention as defined in the claims.

I claim as my invention:

1. A filter comprising a casing formed in two sections, means for securing said sections together, a sieve located in said casing and provided with an aperture, a tube extending axially of said casing through the aperture of said sieve, said tube being of less diameter than the diameter of said aperture, and a sheet of filtering material arranged on said sieve and to be clamped between the peripheries of the aperture and the tube.

2. A filter comprising a casing formed in two sections, means for securing said sections together, a sieve located in said casing and provided with an aperture having a beveled periphery, a tube extending axially of said casing and having a tapered portion projecting through said aperture, said tapered portion being of less diameter than the diameter of said aperture and a sheet of filtering material arranged on said sieve and to be clamped between the beveled periphery of the aperture and the tapered portion of the tube.

3. A filter comprising a casing, a sheet of filtering material located in said casing and provided with a central aperture, a tube extending axially of said casing through said aperture and divided into an inlet and outlet chamber, and means for clamping said filtering material at its periphery and at its central portion adjacent to the aperture.

4. A filter comprising a casing formed in two sections, one of said sections having an annular flange extending into the other section and spaced therefrom, a sieve supported on said flange provided with a central aperture, a tube divided into an inlet and an outlet compartment extending axially of said casing through the said aperture and a sheet of filtering material located on said sieve and arranged to be clamped between the flange and the casing and also between the periphery of said aperture and said tube.

5. A filter comprising a casing formed in two sections, one of said sections having an annular flange extending into the other section and spaced therefrom, a sieve supported on said flange provided with a central aperture, a tube divided into an inlet and an outlet compartment extending axially of said casing through the said aperture, a sheet of filtering material located on said sieve and arranged to be clamped between the flange and the casing and also between the periphery of said aperture and said tube, and a nut swiveled in one section and arranged to engage said tube to lock the sections together.

6. A filter comprising a casing formed in two detachably connected sections, a tube extending axially of said casing and divided into an inlet and outlet compartment, an apertured collar spaced from and surrounding said tube adjacent to the outlet, the apertures of said collar being out of registry with said outlet, and a sheet of filtering material in said casing between the inlet and outlet.

7. A filter comprising a casing formed in two detachably connected sections, a sheet of filtering material located in said casing and provided with a central aperture, a tube extending axially of said casing through said aperture and divided into an inlet and outlet chamber, means for clamping said filtering material at its periphery and at its central portion adjacent to the aperture and a spring surrounding said tube and engaging the one casing section and the sheet of filtering material respectively and having a tendency to exert pressure in a direction of the axis of said casing.

In testimony whereof I have hereunto set my hand in the presence of two subscribing witnesses.

GEORGE M. KNEUPER.

Witnesses:
 JOHN A. KEHLENBECK,
 G. V. RASMUSSEN.